(12) United States Patent
Cronin

(10) Patent No.: US 9,735,105 B2
(45) Date of Patent: Aug. 15, 2017

(54) INTEGRATED SECURE DEVICE

(71) Applicant: Nokia Technologies Oy, Espoo (FI)

(72) Inventor: John Cronin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 10 days.

(21) Appl. No.: 14/884,805

(22) Filed: Oct. 16, 2015

(65) Prior Publication Data

US 2017/0110396 A1 Apr. 20, 2017

(51) Int. Cl.
| | |
|---|---|
| *H01L 23/52* | (2006.01) |
| *H01L 23/528* | (2006.01) |
| *H01L 23/532* | (2006.01) |
| *H01L 21/768* | (2006.01) |

(52) U.S. Cl.
CPC ...... *H01L 23/528* (2013.01); *H01L 21/76879* (2013.01); *H01L 23/53228* (2013.01); *H01L 23/53257* (2013.01)

(58) Field of Classification Search
CPC ............... H01L 23/52; H01L 23/53228; H01L 23/53257; H01L 23/538; H01L 23/5384; H01L 29/84; H01L 29/86; H01L 2924/1461; H01L 41/1134; H01L 41/1136; H01L 41/1138

See application file for complete search history.

(56) References Cited

U.S. PATENT DOCUMENTS

| | | | |
|---|---|---|---|
| 7,577,926 B2 * | 8/2009 | Bretschneider | ......... H01L 23/57 716/126 |
| 2005/0021993 A1 * | 1/2005 | De Jongh | ............. H01L 23/576 257/577 |
| 2009/0102643 A1 | 4/2009 | Haid | |
| 2011/0026742 A1 | 2/2011 | Huang et al. | |
| 2013/0334626 A1 | 12/2013 | Weber | |
| 2014/0264947 A1 | 9/2014 | Lin et al. | |

\* cited by examiner

*Primary Examiner* — Cuong Q Nguyen
(74) *Attorney, Agent, or Firm* — Seppo Laine Oy (57) ABSTRACT

According to an example aspect of the present invention, there is provided an apparatus comprising a silicon layer comprising security circuitry and a first part of a first sensor, an insulator layer attached on the silicon layer, comprising integrated therein a second part of the first sensor, and a conducting pathway coupling the security circuitry to the first sensor, comprising a portion extending on the insulator layer and portions extending at least partly through the insulator layer.

10 Claims, 10 Drawing Sheets

INTEGRATED SECURE DEVICE

FIELD

The present invention relates to the fields of semiconductors and integrated sensors, such as biometric sensors.

BACKGROUND

Security of personal information in electronic communication is of importance. Internet banking, cloud services and e-commerce, for example, depend on reliable and secure methods to handle sensitive information and payments. Encryption, hash functions and standardized protocols are employed to reach these objectives in a way that users can trust and have faith in.

Personal devices may be furnished with mechanisms to protect against theft or unauthorized use. For example, a smartphone may comprise a fingerprint reader to facilitate use by the owner, and to hinder use by a thief. A fingerprint reader may also be used in a storage unit for storing medicaments, for example. A face or voice recognition system may be used for unlocking devices, doors or other electronically secured apparatuses.

A face recognition system may function by first obtaining a digital photograph of a user's face and then comparing it, using a suitable algorithm, to an acceptable reference face. A voice recognition system may function by first obtaining a digital recording of a user's voice and then comparing it, using a suitable algorithm, to an acceptable reference voice. In general, captured biometric data is compared to reference data, the reference data being derived from biometric measurement. In general, using a measured characteristic of a user in such a way may be referred to as biometrics.

A technical challenge in biometric identification is the opportunity for attack provided by storing the reference data of the legitimate user, and obtaining the biometric data for comparison with the reference data. For example, a malware program installed in a smartphone which employs a fingerprint sensor may transmit information characterizing the user's fingerprint to an attacker, with possible dangerous consequences.

Likewise, an attacker with physical access to the device may install hardware modifications thereon, to steal the reference data, or biometric data, as it is communicated inside of the device between components of the device.

SUMMARY OF THE INVENTION

The invention is defined by the features of the independent claims. Some specific embodiments are defined in the dependent claims.

According to a first aspect of the present invention, there is provided an apparatus comprising a silicon layer comprising security circuitry and a first part of a first sensor, an insulator layer attached on the silicon layer, comprising integrated therein a second part of the first sensor, and a conducting pathway coupling the security circuitry to the first sensor, comprising a portion extending on the insulator layer and portions extending at least partly through the insulator layer.

Various embodiments of the first aspect may comprise at least one feature from the following bulleted list:
  one of the portions extending at least partly through the insulator layer is electrically coupled with the second part of the first sensor
  the first sensor comprises a microphone and the first part thereof comprises at least one opening through the silicon layer
  the apparatus further comprises, integrated in the insulator layer, a second sensor, and a second conducting pathway coupling the second sensor to the security circuitry
  the apparatus further comprises, integrated in the insulator layer, a third sensor, and a third conducting pathway coupling the second sensor to the security circuitry
  at least one of: the second sensor is comprised in the group: fingerprint sensor, image sensor and motion sensor and the third sensor is comprised in the group: fingerprint sensor, image sensor and motion sensor
  the second part of the first sensor is located in a recess in the insulator layer
  the second part of the first sensor comprises active elements
  the insulator layer comprises a polyimide layer
  the conducting pathway portions extending at least partly through the insulator layer comprise copper or tungsten studs.

According to a second aspect of the present invention, there is provided a method comprising building security circuitry into a silicon layer, building a first part of a first sensor into the silicon layer, depositing an insulator layer onto the silicon layer, building a second part of the first sensor into the insulator layer, and coupling the security circuitry with the first sensor with a conducting pathway comprising a portion extending on the insulator layer and portions extending at least partly through the insulator layer.

Various embodiments of the first aspect may comprise at least one feature from the following bulleted list:
  coupling the security circuitry with the first sensor comprises coupling one of the portions extending at least partly through the insulator layer with the second part of the first sensor
  coupling one of the portions extending at least partly through the insulator layer comprises etching an opening, filling the opening and chemical-mechanical polishing to form a conductive stud extending at least partly through the insulator layer
  building, integrated in the insulator layer, a second sensor, and a second conducting pathway coupling the second sensor to the security circuitry
  building, integrated in the insulator layer, a third sensor, and a third conducting pathway coupling the second sensor to the security circuitry
  at least one of: the second sensor is comprised in the group: fingerprint sensor, image sensor and motion sensor and the third sensor is comprised in the group: fingerprint sensor, image sensor and motion sensor
  the second part of the first sensor is built into a recess in the insulator layer
  the second part of the first sensor comprises active elements
  the insulator layer comprises a polyimide layer
  the conducting pathway portions extending at least partly through the insulator layer comprise copper or tungsten studs.

According to a third aspect of the present invention, there is provided an apparatus comprising a silicon layer comprising means for performing security processing and a first part of first sensing means, an insulator layer attached on the silicon layer, comprising integrated therein a second part of the first sensing means, and a conducting pathway coupling the means for performing security processing to the first"

sensing means, comprising a portion extending on the insulator layer and portions extending at least partly through the insulator layer.

According to a fourth aspect of the present invention, there is provided a non-transitory computer readable medium having stored thereon a set of computer readable instructions that, when executed by at least one processor, cause an apparatus to at least build security circuitry into a silicon layer, build a first part of a first sensor into the silicon layer, deposit an insulator layer onto the silicon layer, build a second part of the first sensor into the insulator layer, and couple the security circuitry with the first sensor with a conducting pathway comprising a portion extending on the insulator layer and portions extending at least partly through the insulator layer.

According to a fourth aspect of the present invention, there is provided a computer program configured to cause a method in accordance with the second aspect to be performed.

EMBODIMENTS

Integrating secure processing circuitry, or security circuitry, on the same integrated circuit as at least one sensor module enables benefits in integration and security, as sensor information need not be conveyed in leads external to the integrated circuit. The sensor information may comprise fingerprint data or other biometric data, which is of a personal nature. Furthermore, where the biometric data is used as part of an access control solution, theft of the reference data may also compromise the access control solution. Furthermore, tampering with the reference data may be of interest to an attacker for various reasons, such as theft of the device.

For example in Internet of Things, IoT, devices, high security microphones may be needed for use as biometric sensor modules, for example for voice passwords. Integrating sensor modules into the same integrated circuit as security circuitry requires solving the problems of creating an access window to the outside of an electronics silicon chip and integrating, as much as possible, the microphone processes. Furthermore, biometric sensor modules, which may be based on microelectromechanical systems, MEMS, typically use larger features, known as "ground rules", than silicon electronics circuitry, which implies complications in construction processes.

In addition, there may exist a need for using multiple biometric sensor modules at the same time that are built into the same silicon, along with the security circuitry. Integrating the various biometric modules on a security chip in terms of interconnections and packaging provides security benefits. The integration of multiple biometric sensor modules onto one electronics silicon chip requires solving the problems associated with developing a low cost, multiple window solution for biometric sensor modules that have different thicknesses and form factors.

Figure 1:
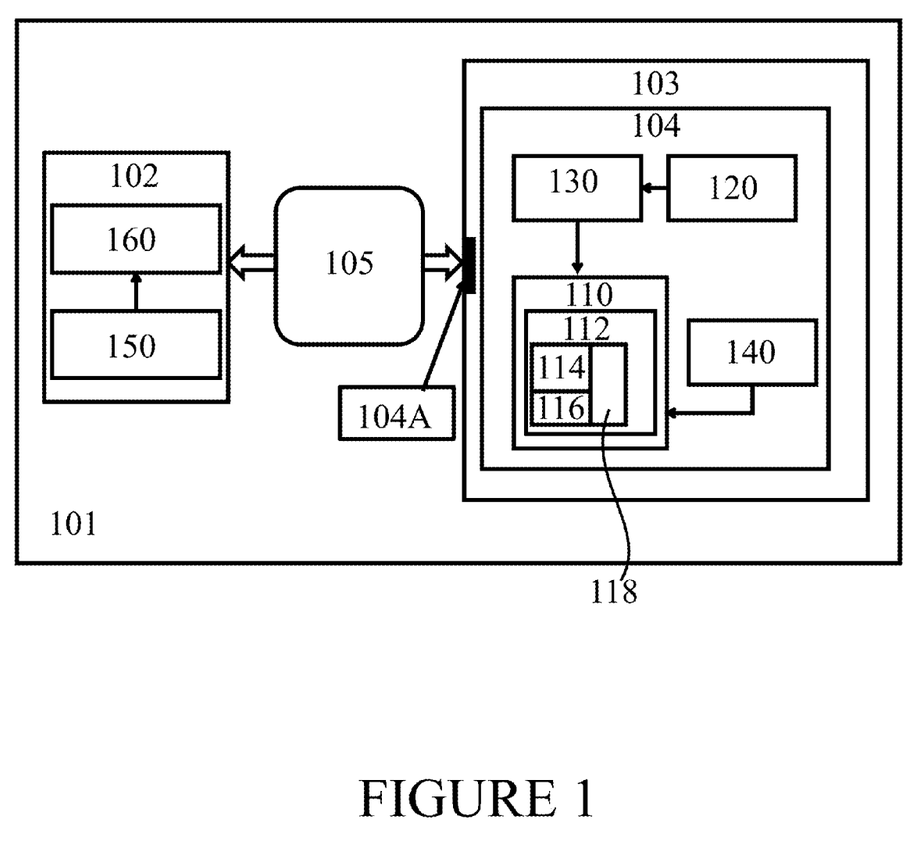
FIG. 1 illustrates an example apparatus in accordance with at least some embodiments of the present invention.

FIG. 1 illustrates an example apparatus in accordance with at least some embodiments of the present invention. The apparatus 101, which may comprise an integrated device, for example, comprises a host platform 102, which comprises a processor 160 and peripherals 150. Host platform 102 is in communication with enclosure 103 to provide or request a security function 105. Security function 105 may comprise watermarking, encryption functions and/or timing, for example. Enclosure connections 104A provide physical connectivity between host platform 102 and enclosure 103.

Enclosure 103 comprises integrated circuit 104. Integrated circuit 104 may comprise, for example, a silicon layer and an insulator layer on the silicon layer, forming a two-layer structure. Security module 110 comprises security circuitry, for example key generation circuitry 112, which in turn may comprise a non-volatile memory 114, a hash function circuitry 116 and a random-number generator 118. Match circuitry 140 may be coupled with security module 110 via suitable electrically conducting leads. Non-volatile memory, such as for example non-volatile memory 114, may be used to store reference data for matching with biometric data from a biometric sensor module. Match circuitry 140 may comprise credential release circuitry.

Match circuitry 140 may be configured to compare newly captured biometric data from a sensor to reference data, to decide whether the reference data and the newly captured biometric data correspond to each other. For example, where a fingerprint matches a reference fingerprint, access may be caused to be granted to a device, a database or a building, for example. The reference data may comprise, for example, information characterizing but not comprising a reference biometric dataset, such as a fingerprint. In other words, the reference data need not be a fingerprint as such, for example, rather, the reference data may merely characterize features of a reference fingerprint. Thus storage of an actual reference biometric dataset, such as a fingerprint, for matching reasons may be unnecessary.

A microphone module 120 is also integrated on integrated circuit 104. Microphone module 120 is coupled to security module 110 via analogue-to-digital converter circuitry, ADC, 130. ADC 130 may further comprise sampling circuitry and/or formatting circuitry, configured to process sensor information incoming from microphone module 120 into a form that is suitable for security module 110 to process. Security module 110 may provide the formatted sensor information to match circuitry 140 for matching, for example.

Figure 2:
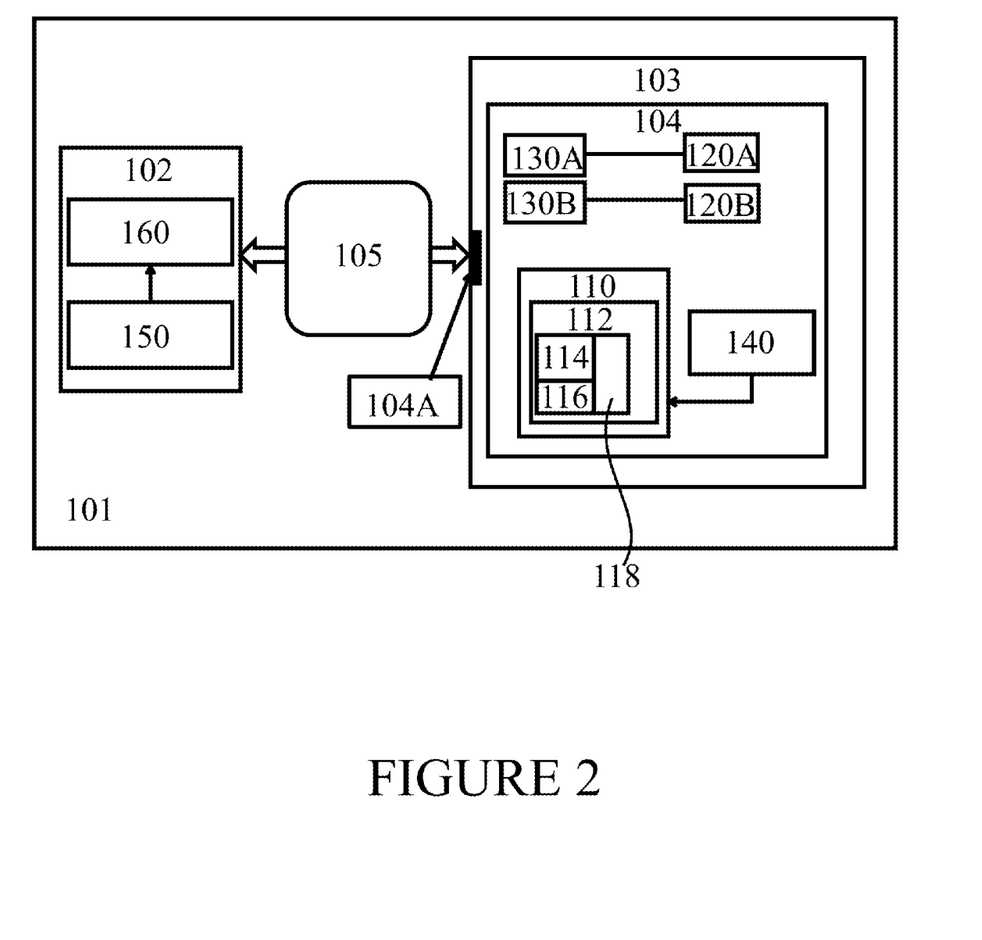
FIG. 2 illustrates an example apparatus in accordance with at least some embodiments of the present invention.

FIG. 2 illustrates an example apparatus in accordance with at least some embodiments of the present invention. Like numbering denotes like structure as in the apparatus illustrated in FIG. 1. The apparatus of FIG. 2 comprises two sensor modules integrated in integrated circuit 104, microphone module 120A and second sensor module 120B. Second sensor module 120B may comprise a fingerprint or motion module, for example. A motion module may comprise an acceleration sensor, for example. An acceleration sensor may be arranged to capture biometric data that indirectly characterizes a user's gait, for example. Each sensor module is in the illustrated example provided with dedicated ADC circuitry, ADC 130A for microphone module 120A and ADC 130B for second sensor module 120B. Each ADC circuitry may be configured to process the sensor information incoming therein into a form that security module 110 can process. Each ADC circuitry may be communicatively coupled, directly or indirectly, with security module 110.

In some embodiments, integrated circuit 104 may comprise a plurality of sensor modules, and a dedicated distinct ADC circuitry for each sensor module. Alternatively, integrated circuit 104 may comprise a plurality of sensor modules, and a shared ADC circuitry for at least two of the sensor modules. The shared ADC circuitry may configurably process sensor information from the at least two sensor modules connected thereto, into forms suitable for security module 110 to process.

Figure 3:
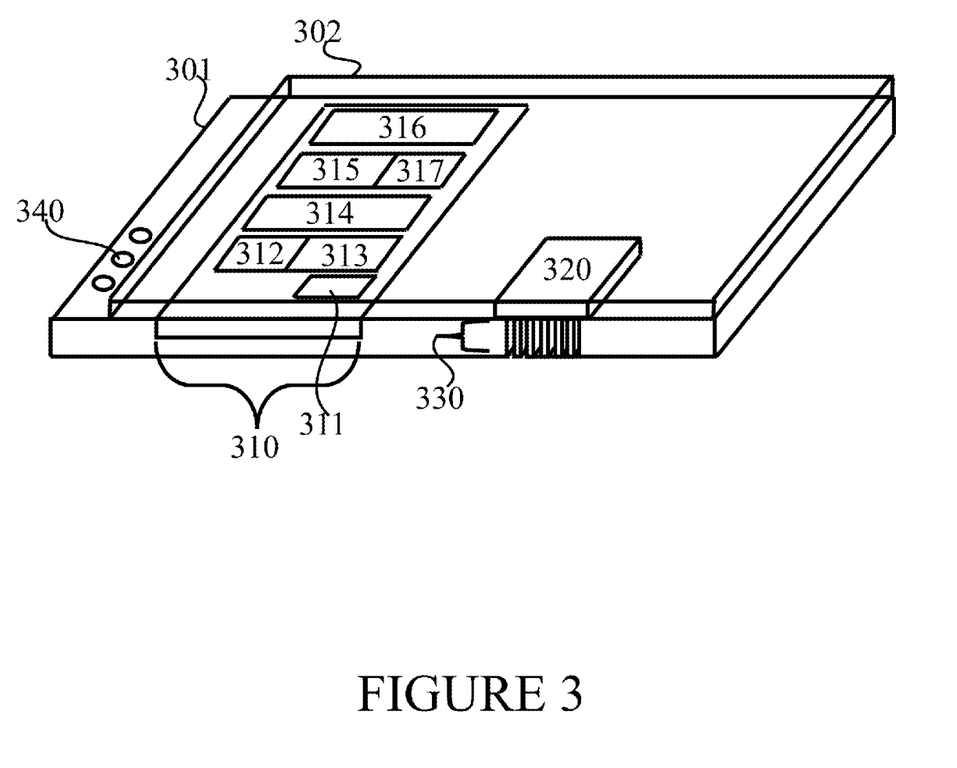
FIG. 3 is a perspective view of the apparatus of FIG. 1.

FIG. 3 is a perspective view of the apparatus of FIG. 1. The apparatus may comprise an integrated circuit, for example. The apparatus comprises a silicon layer 301, and arranged on the silicon layer an insulator layer 302. Insulator layer 302 may comprise a polyimide layer, for example. The apparatus comprises connecting pads 340 that enable connecting the apparatus to external devices. Security circuitry 310 may comprise, for example, conversion circuitry 311, random-number generator circuitry 312, hash function circuitry 313, non-volatile memory 314, key generation circuitry 315, match circuitry 316 and, optionally, other circuitry 317. In various embodiments, at least one of the circuitries described here as being comprised in security circuitry 310 may be absent. A hash function may comprise a cryptographic hash function, such as SHA-1 or SHA-2, for example. Non-volatile memory 314 may comprise a cache memory, for example.

The apparatus further comprises a microphone module 320. Microphone module 320 comprises a part 330 that is built into silicon layer 301, and a part in insulator layer 302. The part 330 in silicon layer 301 may comprise a set of holes or openings through silicon layer 301, for example. Microphone module 320 may be communicatively coupled, via a suitable electrically conducting arrangement, to security circuitry 310.

Figure 4:
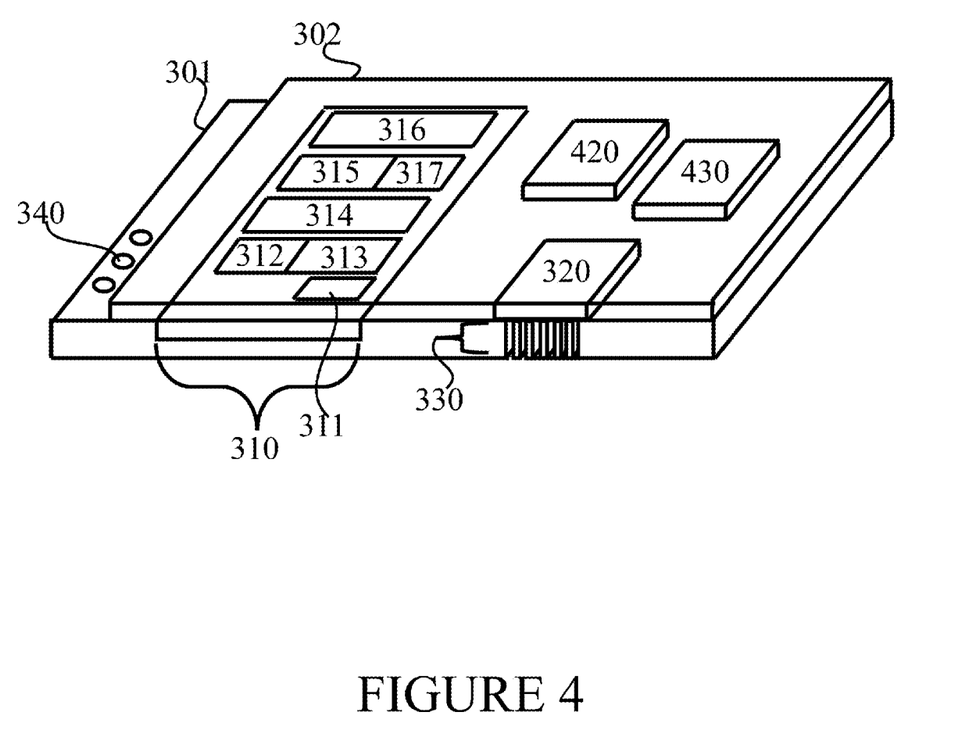
FIG. 4 is a perspective view of the apparatus of FIG. 2.

FIG. 4 is a perspective view of the apparatus of FIG. 2. The apparatus may comprise an integrated circuit, for example. Like numbering denotes like structure as in FIG. 3. In addition to the structure present in FIG. 3, the apparatus of FIG. 4 further comprises second sensor module 420 and third sensor module 430. Second sensor module 420 may comprise a fingerprint sensor module, for example. Third sensor module 430 may comprise an image sensor module, for example. Second sensor module 430 and third sensor module 430 may be integrated in insulator layer 302 of the apparatus, for example. Being integrated in insulator layer 302 may comprise being constructed in a recess in insulator layer 302, such that the sensor module rests attached to silicon layer 301 at the bottom of the recess, for example. Second sensor module 430 and third sensor module 430 may each be communicatively coupled, via a suitable electrically conducting arrangement, to security circuitry 310, to provide biometric data to security circuitry 310 for matching with reference data, for example.

Figure 5:
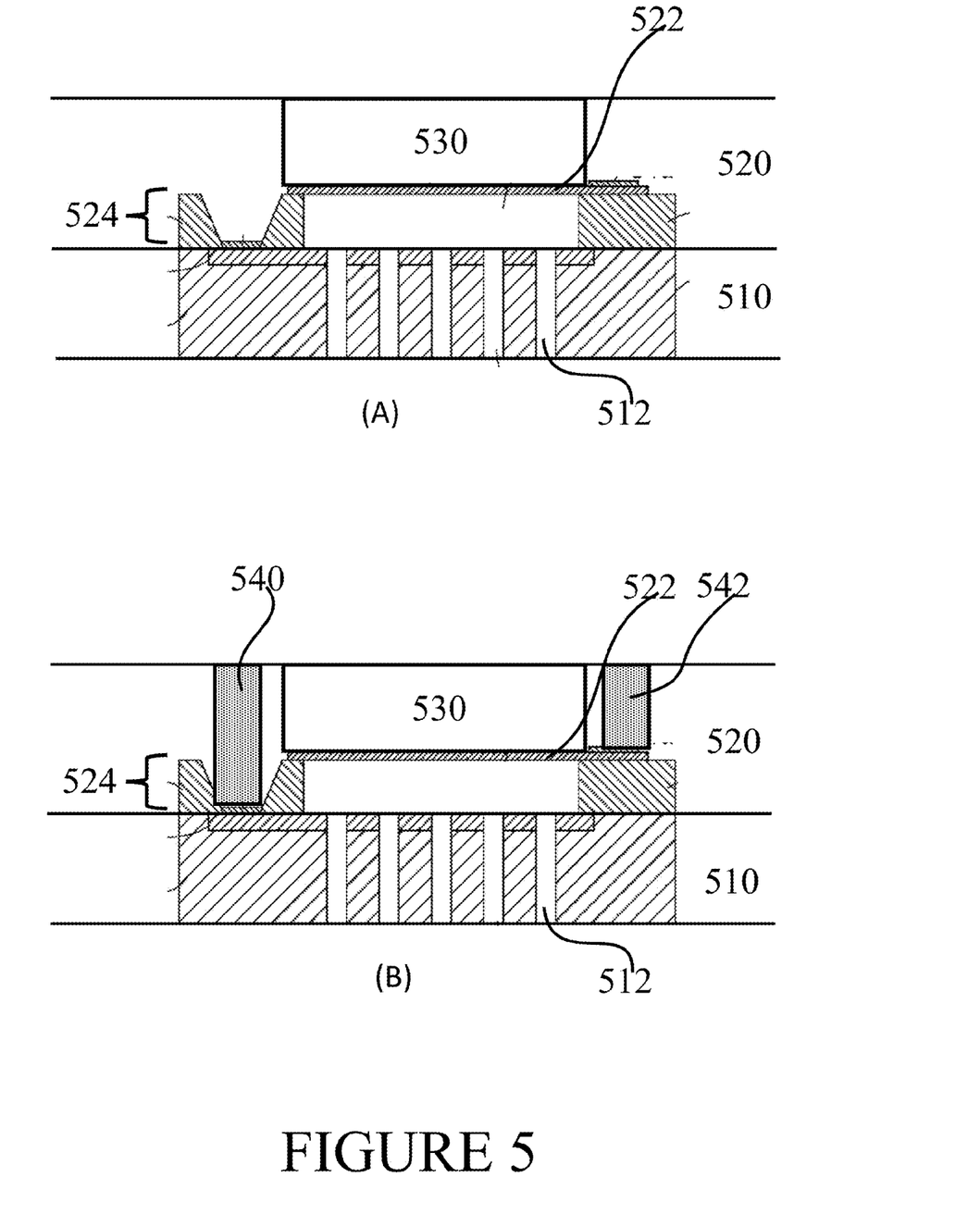
FIGS. 5-7 illustrate phases of a fabrication process in accordance with at least some embodiments of the present invention.
Figure 6:
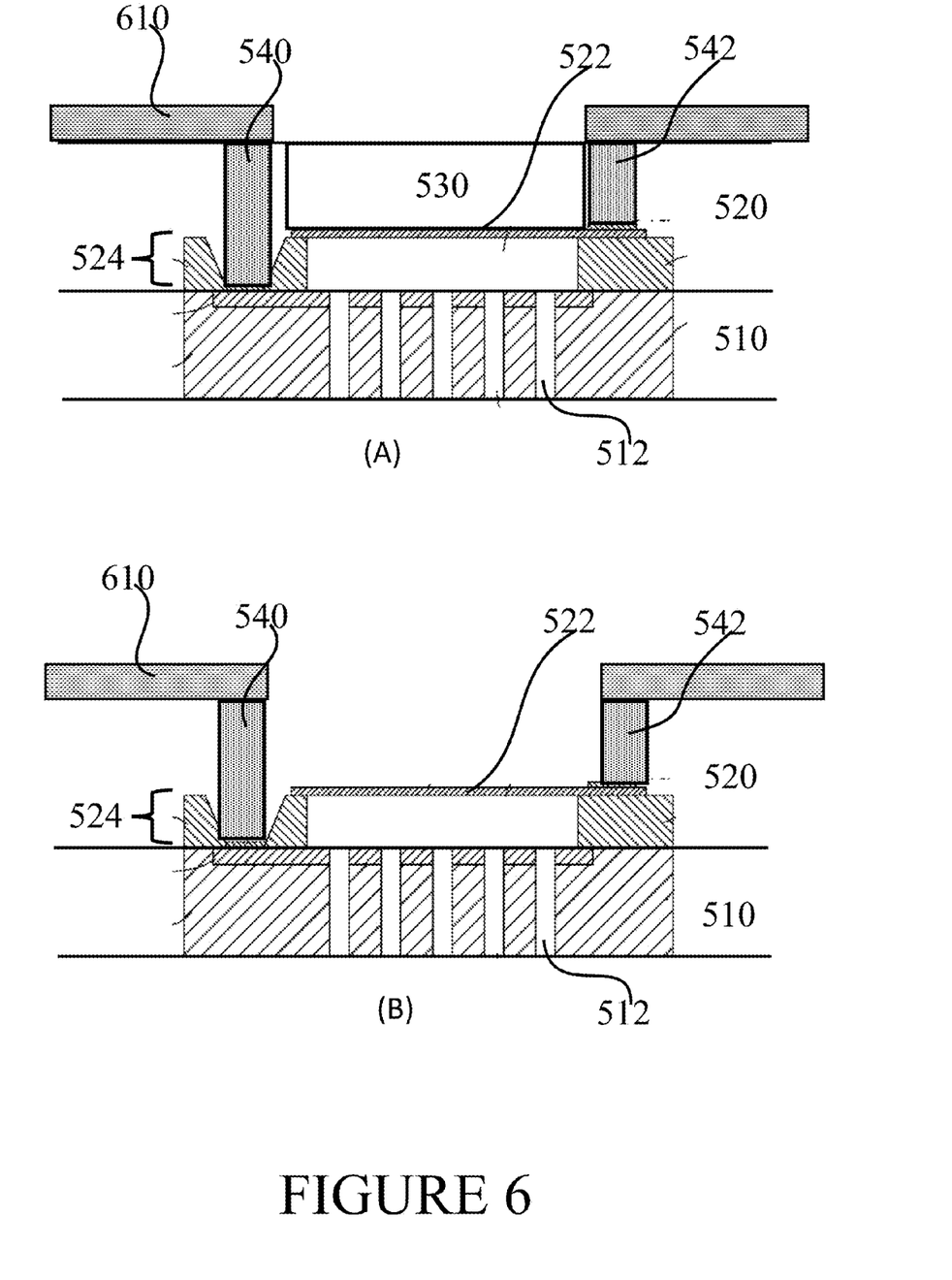
Figure 7:
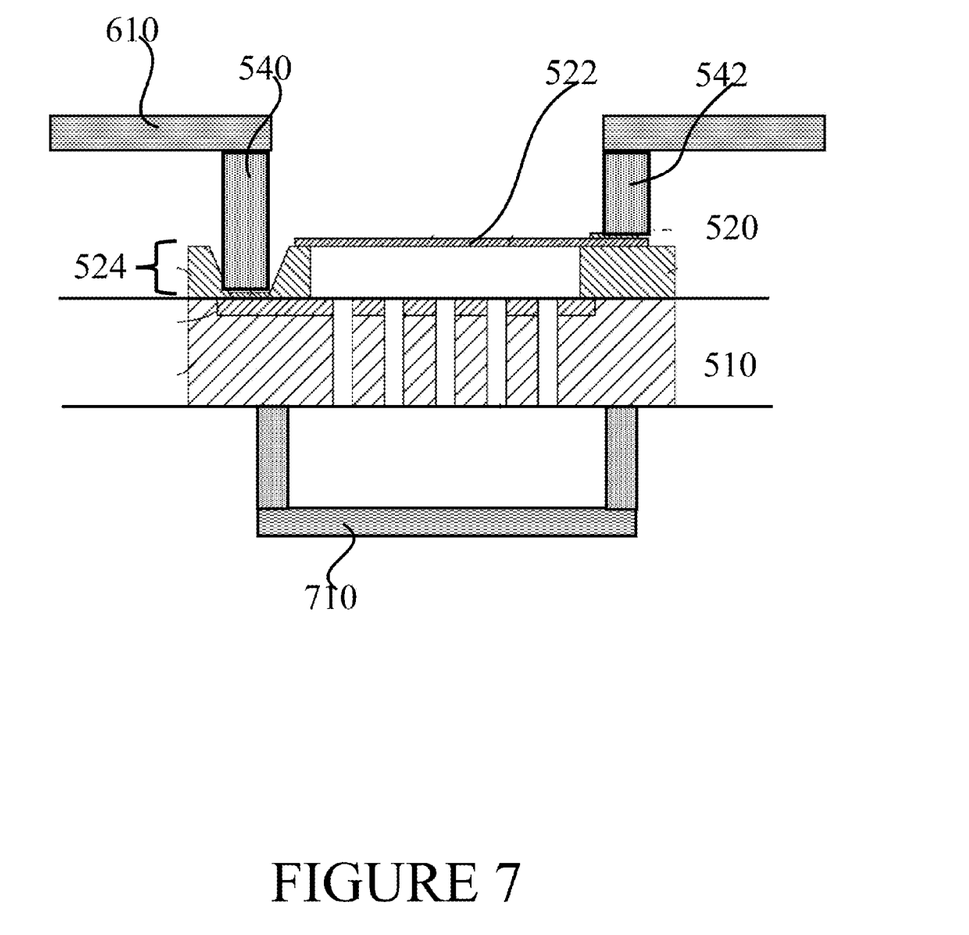

FIGS. 5-7 illustrate phases of a fabrication process in accordance with at least some embodiments of the present invention. In leading to the situation illustrated in FIG. 5, part A, initially security circuitry is built into the silicon layer, or substrate, 510, using the kind of high temperature processing normally used in semiconductor processing. A photoresist may be applied on the silicon substrate and images may be formed to create membrane structures. Membrane structures may comprise openings through the silicon layer, for example. A directional silicon wet etch, such as for example an Ethylene diamine Pyrocatechol and water, or reactive ion etching using known techniques, may be employed to etch the membranes. The photo resist may be removed using standard processes. An insulator, for example polyimide, is deposited and etched back so as to planarize it in the membrane openings, which may be later removed with a wet etch from the back side of the silicon to open the membrane openings.

The rest of the microphone module, the active elements 524, may be built while ensuring no impact to the security circuitry in silicon layer 510. A diaphragm 522 of polycrystalline silicon is comprised in the active elements 524. This can be done, for example, by selectively depositing etch stops on the entire structure, etching the etch stops out of the membrane region, processing the next microphone process step, and removing the etch stop. Each time this is done, this allows each microphone module process step to be achieved without damaging the security circuitry. There are only a limited number of layers to build the microphone and the dimensions are quite large, so these extra etch stop layers will be low in cost and complexity.

Subsequently, a thick oxide layer, which is not shown in FIG. 5, may be deposited over the entire surface, both the microphone module region and the security circuitry regions. A photo resist mask, not shown, may be used over the microphone module. The oxide may then be etched back using standard etching to leave a lost-wax sacrificial oxide layer 530 only on top of the microphone.

A thick polyimide layer 520 is deposited over the entire structure as is well known in the art. A chemical mechanical polish is used to planarize the polyimide to the expose the surface of the lost-wax sacrificial oxide layer 530. Planarizing refers to the act of making planar. This leaves the structure illustrates in FIG. 5, A.

FIG. 5, B illustrates creating vertical conductive studs 540 and 542. Like numbering denotes like structure as in FIG. 5, A. Initially stud openings are etched, filled and chemical mechanical polished back to form vertical conductive studs 540 and 542 connecting to the microphone module. Similar studs are formed connecting to the security circuitry.

In detail, in this phase a photoresist mask, not shown, as commonly used in the art is used to define openings in the regions for the vertical conductive studs 540, 542. The polyimide is vertical etched, creating vertical stud openings using standard reactive ion etching. The photoresist is stripped by known processes, for example a wet etchant that is selective to the under layers of the microphone connections, which may be aluminum, for example. A conformal metallization may be deposited and chemical mechanical polished, CMP, back by normal back end-of-the-line semiconductor processing. The conformal metallization, for example CVD Tungsten or plated Copper, gap fills the vertical stud openings. CMP may create the planarized structure illustrated in FIG. 5, B. Similar vertical conductive studs not only connect to the microphone connections, as illustrated, but also at the same time and process steps the security circuitry regions are connected.

FIG. 6, A and B describe creating metal interconnects to integrate the microphone module with the security circuitry. In FIG. 6, A, metal interconnects 610 are created to connect the vertical studs built in connection with the process of FIG. 5. The metal interconnects and conducting vertical studs together form conducting pathways. In detail, a metallization layer may be deposited over the entire planarized structure, such as, for example, Aluminum Copper Silicon, as is well known in the semiconductor art. A photoresist mask may then be applied, exposed and imaged to create metal interconnection patterns.

The metallization may be etched, for example using reactive ion etch or wet etch as is known in the semiconductor art. The photoresist may then be stripped away. The metal interconnects 610 thus obtained connect electrically to the vertical conductive studs 540, 542 and allow the microphone connections to connect to the security circuitry. In this manner, an interconnection is made between an integrated microphone module and the security circuitry. The results of the process is shown in FIG. 6, A.

Moving to FIG. 6, B, the lost-wax sacrificial oxide layer 530 may be masked and wet etched in a way that is selective to polysilicon 522, for example using 49% HF based aqueous etching. In this way the lost-wax sacrificial oxide layer 530 is removed but the underlying polysilicon structure is retained. The resulting structure is illustrated in FIG. 6, B. An alternate embodiment would be to first apply photo resist, image and expose only the regions of lost-wax sacrificial oxide layer 530, perform the selective etch and then remove the photoresist leaving the same resultant structure.

In operation, a person may talk and the sound waves may enter into the microphone module, causing polysilicon diaphragm 522 to vibrate. Holes 512 allow air to flow through, whereby pressure changes are avoided. As diaphragm 522 is electrically connected, a capacitance difference between diaphragm 522 and the rest of the active elements 524 may be determined to measure the sound and generate sensor information characterizing the sound.

FIG. 7 illustrates a microphone module in accordance with at least some embodiments of the present invention. Like numbering denotes like structure as in FIGS. 5 and 6. With respect to the situation in FIG. 6, B, an enclosure 710 is attached to the silicon layer 510 on an opposite side with respect to the insulator layer 520. Enclosure 710 may be attached to the silicon using adhesive, for example. In some embodiments, any residual polyimide material may be etched away prior to attaching the enclosure.

Figure 8:
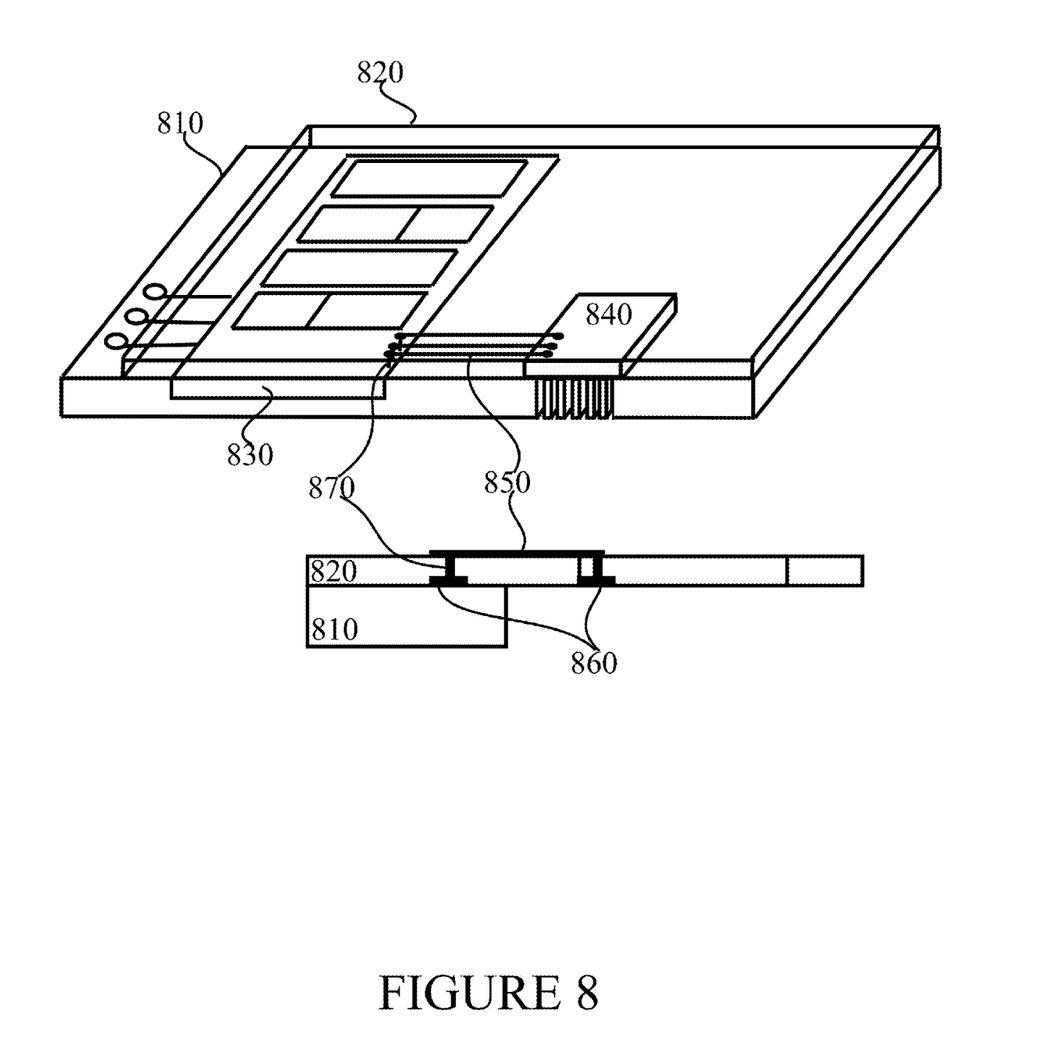
FIG. 8 illustrated an apparatus in accordance with at least some embodiments of the present invention.

FIG. 8 illustrates an apparatus in accordance with at least some embodiments of the present invention. Silicon layer 810, insulator layer 820, security circuitry 830 in the silicon layer, and microphone module 840, have been described above. Microphone module 840 comprises a first part in silicon layer 810 and a second part in insulator layer 820. The vertical conductive studs 870 correspond to vertical conductive studs described above. Likewise, metal interconnects 850 correspond to metal interconnects described above, shown here in perspective. Connecting pads 860 facilitate electrical connection of the conductive studs 870 with the microphone module 840 and security circuitry 830.

Figure 9:
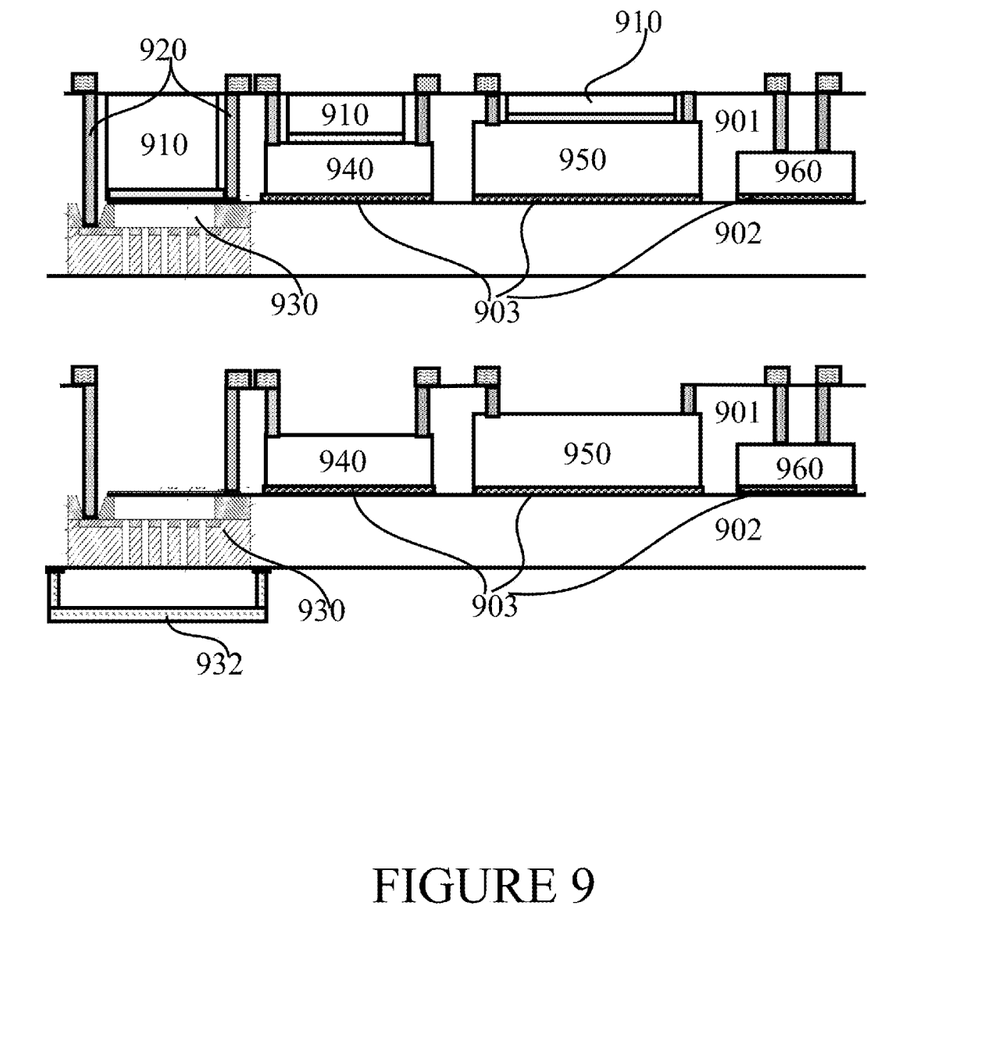
FIG. 9 illustrates an apparatus in accordance with at least some embodiments of the present invention.

FIG. 9 illustrates an apparatus in accordance with at least some embodiments of the present invention. The upper part of the figure illustrates a phase in manufacture prior to removal of lost-wax sacrificial oxide layers 910, and the lower part of the figure illustrates a phase in manufacture subsequent to their removal.

The apparatus of FIG. 9 comprises microphone module 930, fingerprint module 940, imaging module 950 and motion sensor module 960. As a motion sensor doesn't need input from the outside, no window need be provided for it and consequently in the upper part of the figure, motion sensor module 960 doesn't have a lost-wax sacrificial oxide layer. Conductive studs 920 enable electrical interconnection of each of the sensor modules with the security circuitry, as described above. Layers 910 enable planarizing all the sensor modules. In some embodiments, adding an aluminum etch stop on top of the polysilicon diaphragm is performed. This may be done by depositing a blanket aluminum layer, defining photoresist, masking and etching to form the aluminum etch stop region and then stripping the resist. Silicon layer 901 and insulator layer 902 correspond to similar layers in preceding figures.

Bonding elements 903 attach sensor modules 940, 950 and 960 to silicon layer 902. Etch stops are disposed between layers 910 and sensor modules 930, 940 and 950.

In the lower part of the figure, the lost-wax sacrificial oxide layers 910 and etch stops have been removed, and enclosure 932 has been provided for microphone module 930.

Concerning producing the illustrated structure, in some embodiments, each biometric module that needs to have a window opening, such as the fingerprint module and image module, would each have the same etch stop of polysilicon followed by lost-wax sacrificial oxide layer caps 910. The heights of the lost-wax sacrificial oxide layer for each module may be adjusted so the resultant height of each biometric module would be approximately the same. In this way, all biometric modules can be integrated in the same final process. It is also assumed since a motion module does not need a window, it does not need a polysilicon etch stop or a lost-wax sacrificial oxide layer cap. Each biometric module may have a base of silicon to perform attachment of each biometric module to the silicon layer 901 through low temperate silicon to silicon bonding, for example. Each silicon biometric module may be bonded to the silicon on of the substrate 902. Low temperature direct bonding of silicon-to-silicon may be achieved by any of a number of ways including plasma activated bonding, ultra high vacuum, UHV, surface activation by chemical-mechanical polishing, CMP, surface treatment to achieve chemical activation in hydrolyzed tetraalkoxysilanes Si(OR)4, hydrolyzed tetramethoxysilane Si(OCH3)4 and/or nitride acid HNO3.

During construction, a thick polyimide layer may be deposited over the entire structure as is well known in the art. A chemical mechanical polish may be used to planarize the polyimide to the expose the surface of the lost-wax sacrificial oxide layer 910. Vertical conductive studs 920 may be defined by etching stud openings, filling and chemical mechanical polishing back to form the vertical conductive studs in microphone and in the security circuitry, as described above. In this step a photoresist mask, not shown, as common in the art, may be deployed to define openings in the regions for the vertical conductive studs. The polyimide may be vertical etched, not shown, creating vertical stud openings using standard reactive ion etched openings. The photo resist may be stripped by a known process, for example, a wet etchant that is selective to the lower layers of the aluminum microphone connections.

A conformal metallization may be deposited and chemical mechanical polished back by normal back end-of-the-line semiconductor processing. The conformal metallization, for example CVD Tungsten or plated Copper, gap fills the vertical stud openings. Chemical mechanical polishing creates a planarized structure. The vertical conductive studs not only connect to the microphone connections, but also at the same time and via similar, or the same, process steps also the security circuitry regions in silicon layer 902 are connected. A metallization layer may be deposited over the entire planarized structure, such as Aluminum Copper Silicon, as is well known in the semiconductor art, to create interconnects. A photoresist mask may be applied, exposed and imaged to create the metal interconnection patterns, which are not shown in the figure.

The metallization may be etched, for example by reactive ion etching or wet etching. The photoresist may be stripped away as is well known in the art. It should be pointed out that these metals interconnect, that is, connect electrically to the vertical conductive studs and allow the biometric modules connections to connect to the security circuitry. In this manner, a novel interconnection is made between an integrated biometric module and the security circuitry. The result of these process steps is shown in the upper part of FIG. 9.

The open the windows to the sensor modules requiring them the lost-wax sacrificial oxide layers 910 may be masked and wet etched in a way that is selective to aluminum as in common in the art, using an HF based wet etchant.

In this step the lost-wax sacrificial oxide 910 may be removed in a selective wet etch that removes the lost wax sacrificial oxide layer but does not etch the underlying aluminum etch stops. Next the aluminum is etched in a wet etch stopping on polysilicon. Reference [1] describes a number of etchants that etch aluminum selective to polysilicon.

It should be noted that the image module and fingerprint module may each require an etch stop selective to aluminum etch. It is unlikely that the image module would because its surface is that of oxide lens which functions well as an etch stop when removing aluminum. The fingerprint module also may have a surface of oxide for capacitive touch that has the same selectivity to aluminum.

Figure 10:
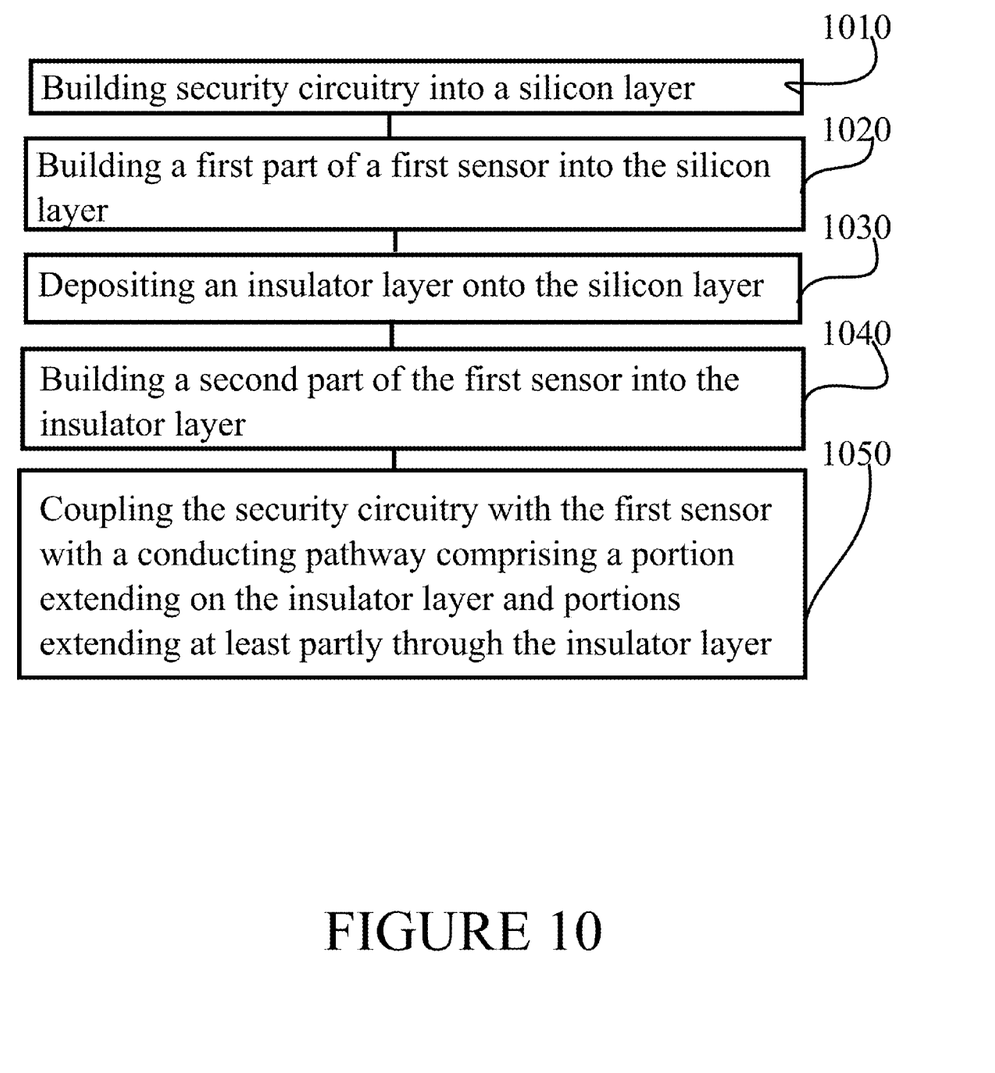
FIG. 10 is a flow graph of a method in accordance with at least some embodiments of the present invention.

FIG. 10 is a flow graph of a method in accordance with at least some embodiments of the present invention. The illustrated method may be performed in a manufacturing facility, for example. Phase 1010 comprises building security circuitry into a silicon layer. Phase 1020 comprises building a first part of a first sensor into the silicon layer. Phase 1030 comprises depositing an insulator layer onto the silicon layer. Phase 1040 comprises building a second part of the first sensor into the insulator layer. Finally, phase 1050 comprises coupling the security circuitry with the first sensor with a conducting pathway comprising a portion extending on the insulator layer and portions extending at least partly through the insulator layer.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in secured handling of sensor data, such as biometric data, to protect against data intrusion.

ACRONYMS LIST

ADC Analogue-to-digital converter
CMP Chemical mechanical polishing
CVD Chemical vapour deposition
IoT Internet of Things
MEMS Microelectromechanical systems

| REFERENCE SIGNS LIST | |
|---|---|
| 101 | The apparatus of FIG. 1 |
| 102 | host platform |
| 103 | enclosure |
| 104 | integrated circuit |
| 105 | security function |
| 104A | Enclosure connections |
| 110 | Security module |
| 112 | key generation circuitry |
| 114 | non-volatile memory (e.g. cache) |
| 116 | hash function circuitry |
| 118 | random-number generator |
| 120, 120A, | microphone module |

-continued

REFERENCE SIGNS LIST

| | |
|---|---|
| 320, 840, 930 | |
| 130, 130A, 130B | analogue-to-digital converter circuitry |
| 140 | match circuitry |
| 120B | second sensor module |
| 301, 510, 810, 901 | silicon layer |
| 302, 520, 820, 902 | insulator layer |
| 310, 830 | security circuitry |
| 311-317 | circuitry comprises in security circuitry 310 |
| 330 | part of microphone module 320 in silicon layer 301 |
| 340 | connecting pads |
| 420 | second sensor module |
| 430 | third sensor module |
| 530, 910 | lost-wax sacrificial oxide layer |
| 512 | holes |
| 524 | microphone active elements |
| 540, 542, 870, 920 | vertical conductive studs |
| 610, 850 | metal interconnects |
| 710 | enclosure (FIG. 7) |
| 860 | connecting pads |
| 903 | bonding elements |
| 1010-1050 | Phases of the method of FIG. 10 |

CITATION LIST

Non Patent Literature

[1] https://nanolab.berkeley.edu/labmanual/chap1/JMEM-SEtchRates2(2003).pdf "Etch Rates for Micromachining Processing—Part II", Kirt R. Williams, Kishan Gupta, Matthew Wasilik, IEEE 2003

The invention claimed is:

1. An apparatus comprising:
a silicon layer comprising security circuitry and a first part of a first sensor;
an insulator layer attached on the silicon layer, further comprising integrated therein a second part of the first sensor, and
a conducting pathway coupling the security circuitry to the first sensor, further comprising a portion extending on the insulator layer and portions extending at least partly through the insulator layer.

2. The apparatus according to claim 1, wherein one of the portions extending at least partly through the insulator layer is electrically coupled with the second part of the first sensor.

3. The apparatus according to claim 1, wherein the first sensor comprises a microphone and the first part thereof comprises at least one opening through the silicon layer.

4. The apparatus according to claim 1, further comprising a second sensor integrated in the insulator layer and a second conducting pathway coupling the second sensor to the security circuitry.

5. The apparatus according to claim 4, further comprising a third sensor integrated in the insulator layer and a third conducting pathway coupling the second sensor to the security circuitry.

6. The apparatus according to claim 4, wherein the second sensor is at least one of a fingerprint sensor, image sensor and motion sensor, and the third sensor is at least one of a fingerprint sensor, image sensor and motion sensor.

7. The apparatus according to claim 1, wherein the second part of the first sensor is located in a recess in the insulator layer.

8. The apparatus according to claim 1, wherein the second part of the first sensor comprises active elements.

9. The apparatus according to claim 1, wherein the insulator layer comprises a polyimide layer.

10. The apparatus according to claim 1, wherein the conducting pathway portions extending at least partly through the insulator layer comprise copper or tungsten studs.

* * * * *